US010473138B2

(12) United States Patent
Costabel

(10) Patent No.: US 10,473,138 B2
(45) Date of Patent: Nov. 12, 2019

(54) LIGHTWEIGHT CONSTRUCTION FASTENER

(71) Applicant: SFS intec Holding AG, Heerbrugg (CH)

(72) Inventor: Sascha Costabel, Herrenberg (DE)

(73) Assignee: SFS intec Holding AG, Heerbrugg (CH)

( * ) Notice: Subject to any disclaimer, the term of this patent is extended or adjusted under 35 U.S.C. 154(b) by 171 days.

(21) Appl. No.: 15/714,242

(22) Filed: Sep. 25, 2017

(65) Prior Publication Data

US 2018/0094670 A1 Apr. 5, 2018

(30) Foreign Application Priority Data

Sep. 30, 2016 (DE) .................. 10 2016 118 676

(51) Int. Cl.
| | |
|---|---|
| *F16B 31/04* | (2006.01) |
| *F16B 37/04* | (2006.01) |
| *F16B 5/01* | (2006.01) |
| *F16B 37/12* | (2006.01) |

(52) U.S. Cl.
CPC .............. *F16B 37/043* (2013.01); *F16B 5/01* (2013.01); *F16B 37/044* (2013.01); *F16B 37/12* (2013.01); *F16B 37/04* (2013.01)

(58) Field of Classification Search
CPC .......... F16B 5/01; F16B 37/04; F16B 37/041; F16B 37/043; F16B 37/044; F16B 37/045; F16B 37/12; F16B 39/14; Y10S 411/97
USPC ......... 411/112, 174, 432, 438, 522–523, 970
See application file for complete search history.

(56) References Cited

U.S. PATENT DOCUMENTS

| | | | | |
|---|---|---|---|---|
| 2,815,789 | A | * | 12/1957 | Hutson ................. F16B 37/044 411/111 |
| 2,937,681 | A | * | 5/1960 | Patten ................... F16B 37/041 411/181 |
| 3,009,499 | A | * | 11/1961 | Weihe ................... F16B 37/041 29/432 |
| 3,165,136 | A | | 1/1965 | Horton |
| 3,446,261 | A | * | 5/1969 | Dey ........................ F16B 27/00 411/85 |

(Continued)

FOREIGN PATENT DOCUMENTS

| | | |
|---|---|---|
| DE | 19831001 | 2/2000 |
| DE | 102005026999 | 12/2006 |

(Continued)

*Primary Examiner* — Roberta S Delisle
(74) *Attorney, Agent, or Firm* — Volpe and Koenig, P.C.

(57) ABSTRACT

A lightweight construction fastener 30 has two basic elements, a clip body 40 including a connected fastening element 32. The clip body 40 has a first leg 41 and a second leg 42, which are arranged located opposite one another and which are connected to one another by a web 45 on one end. The fastening element 32 includes a flat base plate 34 with two protrusions 35, 36, and a cylindrical holding part 33. On its outer side, the second leg 42 has two frames 43, 44 with apertures 46, 47. They are provided to accommodate the protrusions 35, 36 of the fastening element 32, so that the fastening element is held in the clip body 40 with play, but in a captive manner. The frames 43, 44 are substantially arranged at right angles to the longitudinal axis LA, which is why the orientation of the two protrusions 35, 36 is also oriented along the axis LA.

10 Claims, 4 Drawing Sheets

(56) References Cited

U.S. PATENT DOCUMENTS

| | | | |
|---|---|---|---|
| 4,074,491 A | 2/1978 | Bell et al. | |
| 4,219,064 A | 8/1980 | Lozano | |
| 6,474,917 B2 | 11/2002 | Gauron | |
| 6,854,941 B2* | 2/2005 | Csik | F16B 37/044 411/111 |
| 6,918,725 B2* | 7/2005 | Gauron | F16B 37/043 411/112 |
| 7,802,952 B2* | 9/2010 | Toosky | F16B 17/006 411/113 |
| 8,177,466 B2* | 5/2012 | Csik | F16B 37/043 411/174 |
| 8,353,649 B2* | 1/2013 | Csik | F16B 37/045 411/108 |
| 9,267,529 B2* | 2/2016 | Tejero Salinero | F16B 37/041 |
| 2002/0182027 A1 | 12/2002 | Gauron | |
| 2008/0008558 A1 | 1/2008 | Costabel | |
| 2008/0310931 A1 | 12/2008 | Csik et al. | |
| 2015/0152908 A1 | 6/2015 | Schwarzbich | |
| 2017/0350436 A1* | 12/2017 | Vovan | F16B 37/044 |

FOREIGN PATENT DOCUMENTS

| | | |
|---|---|---|
| DE | 102015009643 | 1/2017 |
| WO | 2016102989 | 6/2016 |

\* cited by examiner

LIGHTWEIGHT CONSTRUCTION FASTENER

INCORPORATION BY REFERENCE

The following documents are incorporated herein by reference as if fully set forth: German Patent Application No. 10 2016 118 676.7, filed Sep. 30, 2016.

FIELD OF THE INVENTION

The invention at hand deals with lightweight construction fasteners, which are identified as clip nut, clip, cage nut in the industry or which are identified as clip nut according to the English term. They are used in the vehicle construction and in the aircraft industry to safely connect components to one another without large effort.

BACKGROUND

In the vehicle construction as well as in the aircraft industry, fastening elements are used e.g. for coverings, which must fulfill specific requirements. To avoid machining steps in response to the final assembly, plate-shaped elements are pre-drilled, e.g., and are provided with clips or inserts, respectively, which have further screwing elements, which are elastic or which are attached with play, prior to the final assembly. In response to the final assembly, the connectors or fasteners, respectively, to other covering elements or structurally bearing elements, respectively, then engage with these screwing elements or snap retainers, respectively. The plate-shaped elements or components, respectively, are hereby frequently lightweight construction elements or sandwich panels, respectively, which, for weight reasons, predominately consist of two outer layers (of plastic or aluminum), which are adhered with a honeycombed reinforcement therebetween.

A clip 10 of the mentioned type is shown in FIG. 1. On principle, it has the basic shape of a clamp comprising a first leg 11 and a second leg 12 comprising a connecting web 13. For the assembly, the clip is pushed onto a plate (only suggested, 18), so that a fastening element 20 comes to rest above a prepared opening in the plate (covered in FIG. 1). This fastening element 20 substantially consists of a plate-shaped base (not visible in FIG. 1) comprising two lugs (protrusions 14, 15) and a nut part 21. The two protrusions 14, 15 are in each case held in a frame or by a bracket 16, 17, respectively, which spans the lugs, of the side plates 19, 22 of the upper clip leg 11. The frames are embodied in such a way that the fastening element 20 has lateral play, but cannot fall out of the clip. The fastening type, which the fastening element 20 allows, can be realized in many alternatives, for example as releasable or non-releasable snap-in connection comprising a fixed or a plurality of catches. The cylindrical section 21 can furthermore have an internal thread for a screw. A screw connection hereby has the advantage of being releasable and the possibility of tightening torque control.

Depending on the application profile, the fastening element 20 can be made of metal or plastic. If high strengths are required, metal is preferred, but represents a challenge in response to the production. Very high production costs are to be expected for turned/milled parts. A fastening element can thus also be made of wire, tape material or sheet metal in a multi-stage forming process, but thereby also runs through a plurality of operation cycles and must subsequently possibly be subjected to a heat treatment.

In response to the use of a lightweight construction fastener, in response to its assembly, a fastener is guided—in FIG. 1 from below—through a recess in the leg 12, an opening which is brought into alignment in the plate 18, and a further opening in the upper leg 11, and is connected to the fastening element 20 at that location. The plate 18 is thus fastened to a different element. There are many variations of this type of clip fasteners with different leg lengths, shapes and for different plate thicknesses.

U.S. Pat. No. 4,219,064 shows the basic principle of such a fastener made of metal, the more recent U.S. Pat. No. 6,474,917 shows an embodiment with plastic clip and a fastening element of metal. Both publications focus on an arrangement, in the case of which openings are provided in the side plates on the longitudinal side of the clip. In the case of U.S. Pat. No. 4,219,064, this arrangement results due to the production of a plate-shaped sheet metal part, out of which the openings are punched out on the side and two tabs comprising those very openings are subsequently bent by 90° to form side plates. This results in a structural reinforcement of the upper leg. The later U.S. Pat. No. 6,474,917 adopts the arrangement and forms the side plates of plastic with the corresponding openings.

This arrangement, however, also has disadvantages: Due to the arrangement of the fastening element 20 at right angles to the longitudinal extension of the upper clip leg, the fastening element or the embodiment of the protrusions 14, 15, respectively, defines the width of the clip. The frames 16, 17 must additionally be designed in such a way that they can also fulfill the described reinforcing effect, even though the holding openings are at a structurally unfavorable location in the side wall, namely exactly at the height of the clip, at which the force introduction occurs by the fastening element. Due to the fact that the fastening element and the clip are typically made and assembled separately (by snapping in after briefly pushing away one of the frames), a stable frame has a negative impact on the ease of assembly of the fastener: the more stable the frame, the more stable the lightweight construction fastener per se—but the more difficult the production.

SUMMARY

It is the objective of the invention at hand to reduce the above-mentioned disadvantages of the prior art and to in particular to provide a lightweight construction fastening element, which is simple in terms of construction. Such a lightweight construction fastener in the most general form is provided having one or more features of the invention, which are described below and in the claims which provide useful variations and enhancements.

On principle, it is provided to rotate the arrangement of the frames or cages 16, 17, respectively, by 90°, so that the holding lugs or protrusions 15, 16 of the fastening element extend parallel to the longitudinal extension of the leg.

The lightweight construction fastener and its design will be explained below in the context of the invention by the drawings. This lightweight construction fastener can be used in many variations. The description below focuses on clips in the aircraft construction, in particular in the interior design of the cabin as exemplary application example. However, this shall not be understood to be limiting, and the applicability of a lightweight construction fastener is not limited thereto.

DETAILED DESCRIPTION

Figure 1:
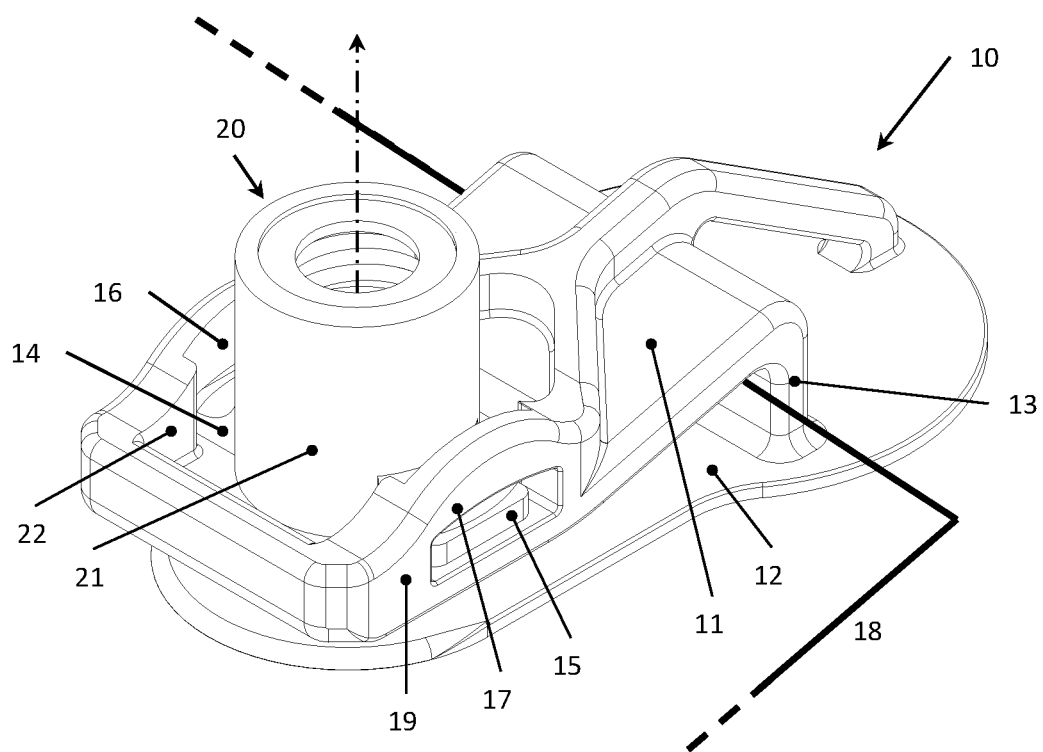
FIG. 1 is a view of a lightweight construction fastener according to the prior art. The features have already been discussed above.

On principle, a lightweight construction fastener 30 according to the invention or clip nut, respectively (see FIG. 2), includes two basic elements, a clip body 40 and a connected fastening element 32. The clip body 40 has a first leg 41 and a second leg 42, which are arranged located opposite one another and which are connected to one another by a web 45 on one end. The legs face one another with their inner side, the outer sides in each case face away from one another. The legs 41, 42 are not necessarily parallel, according to the object of a clamp, the legs can also draw an acute angle. In their direction of extension, the legs 41, 42 define a longitudinal axis LA, which is in a substantially vertical position on the web 45. The fastening element 32 comprises a flat base plate 34 comprising two protrusions or lugs 35, 36, respectively. A (preferably cylindrical) holding part 33 comprising a central opening 31, which also extends through the base plate 34, is connected to the base plate. On its outer side, the second leg 42 has two frames 43, 44 comprising apertures 46, 47. The latter are provided to accommodate the protrusions 35, 36 of the fastening element 32. The distance of these two frames relative to one another is chosen in such a way that the fastening element can be held in the clip body 40 with play, but in a captive manner. By this play, the fastening element 32 can later compensate adjustment tolerances in response to the insertion of a fastener. In contrast to the prior art, the frames are not arranged on the longitudinal sides of the second leg, but at right angles thereto. In other words, the frames 43, 44 are substantially arranged at right angles to the longitudinal axis LA. A connecting line through the two apertures 46, 47 is thus located parallel to the longitudinal axis LA, and the orientation of the two lugs/protrusions 35, 36 is oriented along the axis LA as well.

This arrangement has the advantage that the width of the clip body 40 is no longer determined by the width of the base plate 34 plus the extension of the protrusions, but can orientate itself on the width of the base plate alone. The clip body can thus be constructed in a more compact and lighter manner.

In response to the final assembly, the holding part 33, which is arranged on the base plate 34, serves the purpose of accommodating a fastener or mandrel. For this purpose, provision is made in the area of the opening 31 for holding elements. The latter can be embodied as latching elements, so that a mandrel engages with the latching elements by means of a counter profile and is held. As is known from the prior art, the latching elements can be embodied in a releasable or non-releasable manner again. In the alternative, the holding element can have threads on the inner side of the opening 31, can thus represent a nut construction.

The holding element 33 is typically prefabricated in two pieces; the base plate made of sheet metal comprising the required thickness is preferably stamped out. The nut can be produced in a manner, which is known per se, from a wire piece by forming. The outer form of the holding part 33 is secondary, because the force deflection or torque deflection, respectively, takes place via the protrusions 35, 36 in response to the final assembly. For this purpose, the holding part 33 is frequently connected to the base plate 34 by means of welding, adhesion or injection.

In the alternative, the holding part 33 can also be embodied as wire nut 51, as it is illustrated in FIGS. 2, 3, 7, 8, 9. The threads are hereby constructed from an angularly profiled wire and the dimensions of the thread pattern sizes are thus defined. The wire layers are typically welded and thus create the structural strength.

Figure 10:
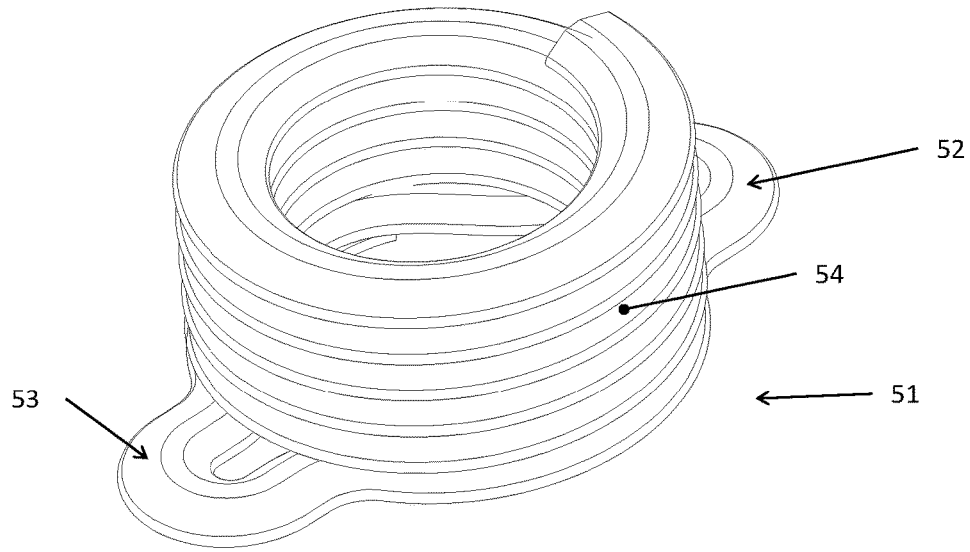
FIG. 10 is a perspective view of a fastening element formed as a wire nut or wire thread nut.

FIG. 10 shows a further developed wire nut or wire thread nut 51. This includes a thread part 54, which is helically wound from wire, as well as of projecting wire loops 52, 53, which are integrally molded from the wire coil and which emerge from the wire of the wire nut 51 without interruptions. These loops take over the function of a torque support or of the protrusions 35, 36, respectively. The wire will preferably have an angular cross sectional profile, which has the result in the helically wound thread part that thread flanks and treaded tips are embodied. The number of the loops 52, 53 does not need to be limited to 2. Depending on the demands, three, four or more of such loops can be formed.

In a further development of the invention, the web 45 is embodied in an articulated manner, in other words it is designed in such a way by means of structural of constructive measures, respectively, that the web 45 allows for a relative movement, in particular a spreading of the legs 41, 42. The insertion of a plate-shaped object between the inner sides of the legs 41, 42 can thus be ensured. This can be attained by the selection of the material of the web 45 or, e.g., by local adaptation of the wall thickness.

Figures 6, 7:
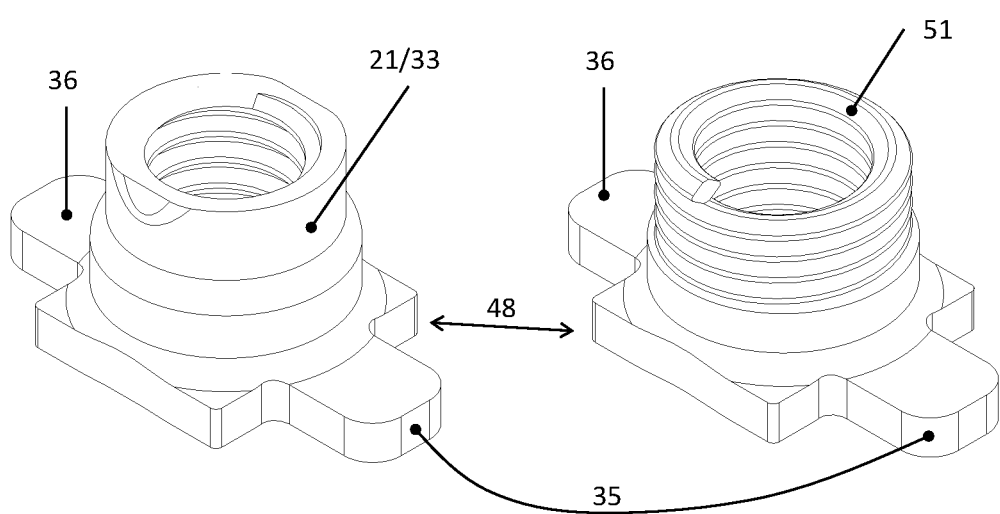
FIG. 6 is a perspective view of a fastening element with a first embodiment of a base plate.
FIG. 7 is a perspective view of a fastening element with a second embodiment of a base plate.

FIGS. 6 to 9 show different alternatives of base plates. The flat base plate of FIGS. 6 and 7 is identified as feature 48 and shows a substantially angular, preferably rectangular or square basic shape, wherein the protrusions or lugs 35, 36, respectively, are attached at two opposite edges. FIG. 6 shows a nut according to the prior art as holding part, while FIG. 7, in contrast, shows a wire nut 51.

Figures 8, 9:
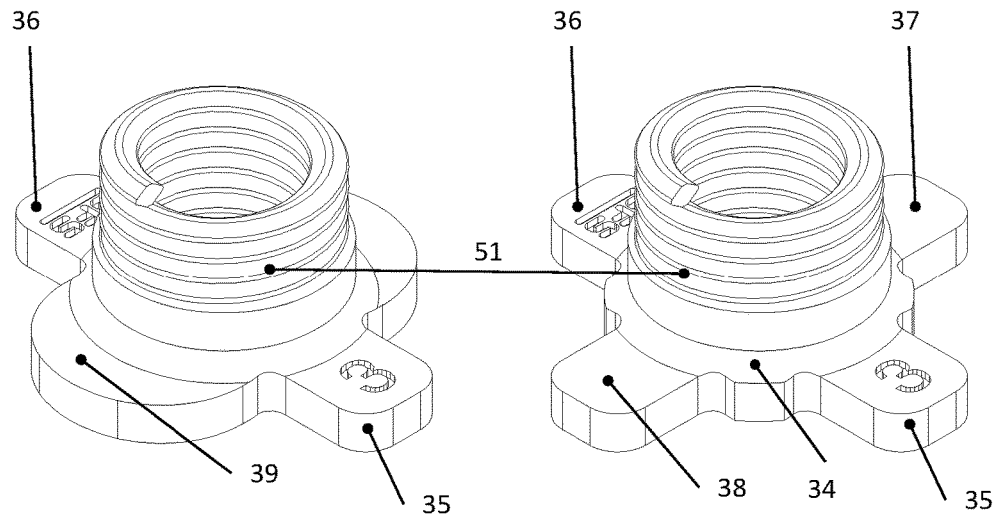
FIG. 8 is a perspective view of a fastening element with a third embodiment of a base plate.
FIG. 9 is a perspective view of a fastening element with a fourth embodiment of a base plate.

In the alternative and particularly preferably, FIG. 8 shows a flat base plate 39 comprising a substantially round, preferably oval basic shape, wherein the protrusions or lugs 35, 36, respectively, are attached at opposite locations of the base plate. This design has a plurality of advantages. On the one hand, a better tilt stability is attained by this round shape, specifically the oval shape, with the large semi-axis at right angles to the connecting line of the protrusions 35, 36. Moreover, the rounded shape has advantages in response to the assembly of the lightweight construction fastener.

In a further preferred embodiment, the flat base plate 34 has two further protrusions or lugs 37, 38, respectively, which are arranged so as to be rotated by 90° with respect to the other protrusions 35, 36. These additional protrusions can, but do not need to, be embodied identical in shape to the protrusions 35, 36. To embody them to be identical has the advantage that the installation position is uncritical. To design them differently may make it possible to embody the flat base plate 34 to be slimmer and to thus maintain the above-described advantage of the clip design, which is slimmer as a whole.

In a further development of the lightweight construction fastener, the outer side of the second leg 42 does not have any side walls, ribs or similar reinforcements, which are arranged parallel to the longitudinal axis LA in the longitudinal direction, in the accommodating area of the base plate 34. The lack thereof has advantages in response to the assembly of clip body 40 and fastening element 20 into the finished clip 30.

Figure 2:
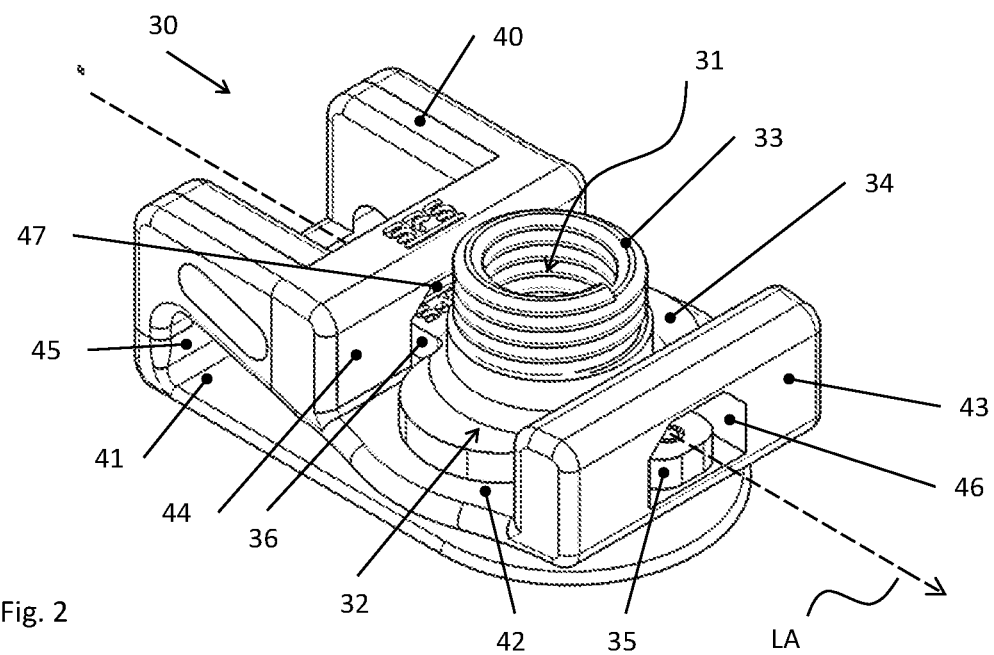
FIG. 2 is a perspective view of a lightweight construction fastener according to an embodiment of the invention.

FIG. 2 shows a lightweight construction fastener 30 according to an embodiment of the invention; substantially constructed of a first leg 41 and a second leg 42, connected by a web 45 (embodied in two pieces here). The expansion of the legs vertically to the web or web area, respectively, defines a longitudinal axis LA of the lightweight construction fastener 30. The general setup as clamp or clip is supplemented by the elements, which accommodate the fastening element 32 on the upper side or outer side, respectively, of leg 42. This fastening element includes a base plate 34 comprising a cylindrical holding part 33 fastened thereto, which has a central through opening 31. In the basic design, two lugs or protrusions 35, 36 are located on the base plate 34. This protrusions engage with two openings 46, 74, which are provided in frames or cages 43, 44, which are arranged at right angles to the longitudinal axis LA.

Figure 3:
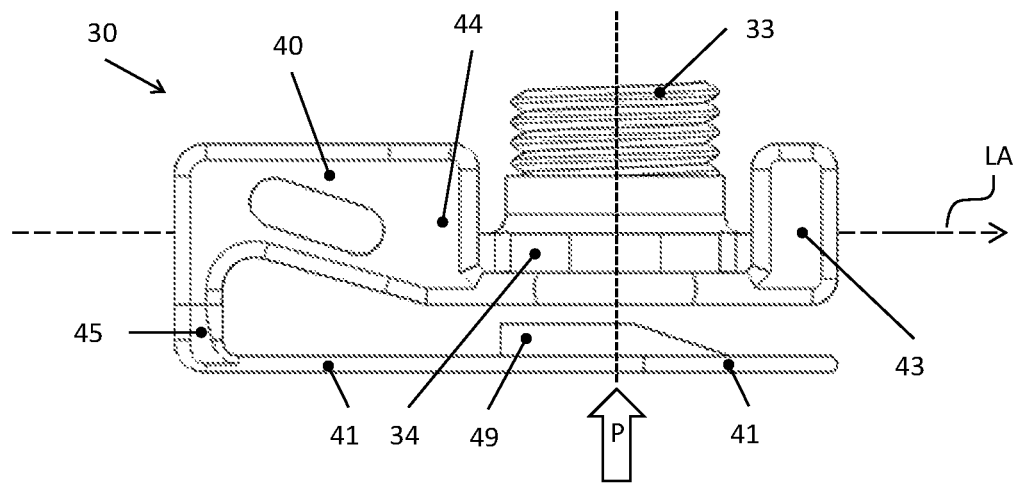
FIG. 3 is a side view of the lightweight construction fastener of FIG. 2.

FIG. 3 shows the lightweight construction fastener from FIG. 2 in side view. The space between the legs 41, 42, which is provided as accommodation for a plate-shaped element, can be seen clearly. For this purpose, the clip 30 is pushed onto an edge of the plate, the web 45 is thereby preferably used as stop. Suggested by the arrow P, a fastener (not shown) is inserted from below through an opening in the leg 41, a bore present in the plate-shaped element and through a corresponding hole in the leg 42 in such a manner that it can connect to the holding elements of the holding part 33. Feature 49 is a fixing aid for the clip 30, a ring or collar-shaped border, which surrounds the hole in the leg 41 and which engages with the bore of the plate-shaped element and thus fixes the clip until the final assembly.

Figure 4:
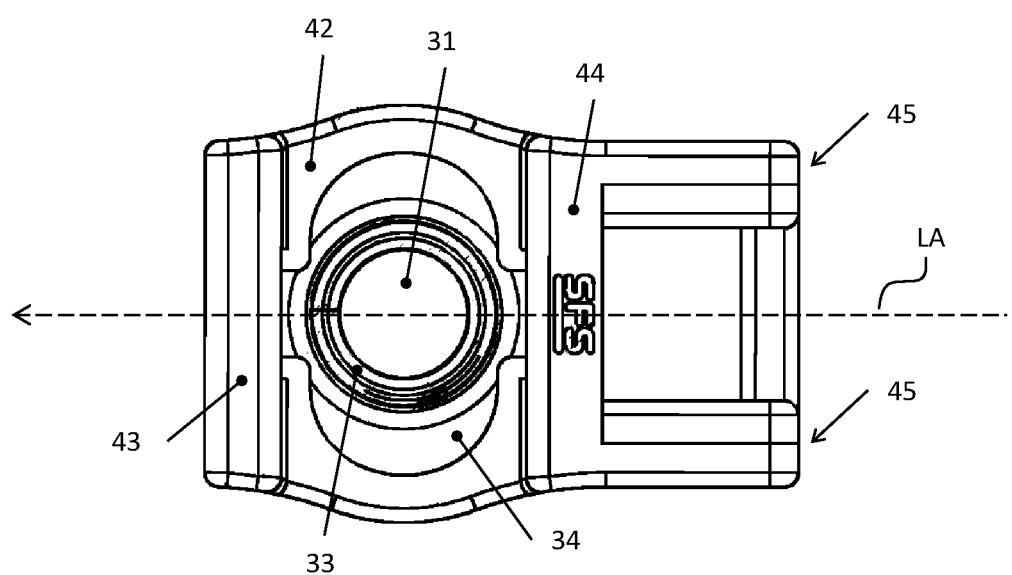
FIG. 4 is a top view of the lightweight construction fastener of FIG. 2.

FIG. 4 shows the lightweight construction fastener 30 in top view. The passage opening 31 in the holding element 31 becomes visible here, which has lateral play due to the holding of the base plate 34 in the frames 43, 44 and which thus allows for a fine-adjustment in response to the final assembly. The embodiment of the articulated web 45 with 2 partial sections is also clearly visible.

FIG. 5 is again a perspective illustration of an alternative of a lightweight construction fastener 30 according to the invention. All elements are functionally identical with the description of FIGS. 2-4. The embodiment of the frame or cage 43, respectively, is embodied differently and thus follows design specifications or necessities, respectively, which result from the installation geometry.

Figure 5:
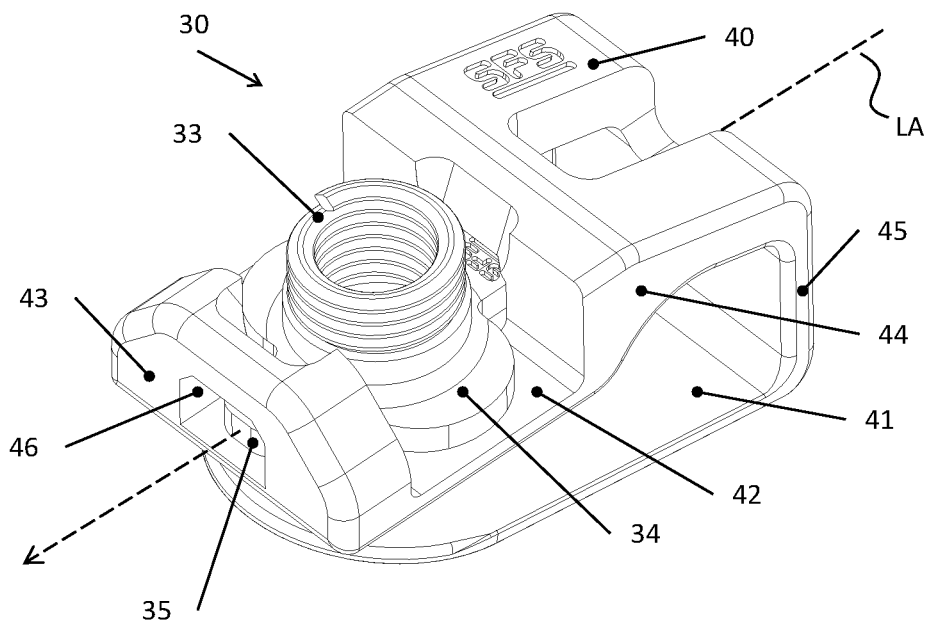
FIG. 5 is a perspective view of a lightweight construction fastener according to another embodiment of the invention.

The embodiment according to FIGS. 2 and 5 shows that the clip 30 does not have any lateral side walls, that is side walls, which are arranged in parallel to the longitudinal axis LA in the longitudinal direction, or reinforcements on the outer side/upper side of its leg 42 in the accommodating area of the base plate 34. The clip leg 42 is thus also more flexible at that location, which also significantly facilitates the assembly of the fastening element 32. It turned out that a particular reinforcement of the upper leg is not necessary, because the fastening element 32 exerts all significant forces normally to the leg surface after the final assembly of the clip. Due to the fact that said leg surface bears flat on the plate-shaped element, a special reinforcement is not required.

FIGS. 6 and 7 show angular base plate variations 48 comprising the protrusions 35, 36. FIG. 6 shows a holding part 33 similar to the design of the prior art (feature 21, FIG. 1). FIG. 7 shows an alternative wire nut 51.

FIG. 8 shows a holding element 32 comprising a preferred embodiment of a base plate comprising an oval basic shape. Feature 39 points to the bulges along the large semi-axis of the oval.

FIG. 9 shows a variation of that of FIG. 8, where the oval bulges 39 have been replaced by lugs/protrusions 37, 38.

FIG. 10 shows a wire nut 51, which has been made completely of profile wire, including threaded part 54 and wire loops 52, 35 (functionally equivalent to protrusions 35, 36). This makes it possible to make the fastening element 32 in one piece.

Today, clips, clip nuts or lightweight construction fasteners, respectively, of the described type are predominantly made of plastic or of plastic together with metal inserts, respectively. Depending on the intended purpose and load, different plastics are available, depending on the required elasticity, temperature and non-flammability.

The above-described details or embodiments, respectively, can be combined with one another, insofar as technically possible and meaningful, even if not every combination has been described explicitly.

LIST OF REFERENCE NUMBERS

10 clip
11 first leg
12 second leg
13 web
14, 15 protrusions, lugs
16, 17 frame, bracket
18 plate
19, 22 side plates
20 fastening element
21 nut part
30 lightweight construction fastener, clip nut, clip
31 opening, through opening
32 fastening element
33 holding element, holding part
34 base plate
35, 36 protrusion, lug
37, 38 protrusion, lug
39 base plate oval
40 clip body
41 first leg
42 second leg
43, 44 frame, cage
45 web
46, 47 aperture
48 base plate comprising angular basic shape
49 fixing element
51 wire nut
52, 53 wire loop(s)
54 threaded part

The invention claimed is:

1. A lightweight construction fastener or clip nut, respectively, comprising:
 a clip body, comprising
 a first leg and a second leg, which are arranged located opposite one another and which are connected to one another by a web on one end;

a direction of extension of the legs away from the web defines a longitudinal axis LA, which is in a substantially vertical position on the web; and sides of the legs, which face one another, define inner sides and sides of the legs facing away from one another define outer sides, fastening element comprising a flat base plate comprising two protrusions or lugs, respectively, and a holding part, which is connected to the base plate, comprising a central opening, which extends through the base plate, two frames located on the outer side of the second leg, the two frames comprising apertures, which accommodate the protrusions of the fastening element and which are spaced apart from one another such that the fastening element is held in the clip body with play in a captive manner;

the frames are substantially arranged at right angles to the longitudinal axis LA and a connecting line thus runs through the two apertures parallel to the longitudinal axis LA;

the holding part includes holding elements in the area of the opening, and the holding elements are embodied as latching elements or as threads, respectively; and the threads are constructed as a wire nut from an angularly profiled wire, a dimensioning of which defines thread pattern sizes.

2. The lightweight construction fastener according to claim 1, wherein the web is embodied in an articulated manner to allow insertion of a plate-shaped object between the inner sides of the legs.

3. The lightweight construction fastener according to claim 1, wherein the flat base plate has a substantially angular basic shape, and the protrusions or lugs, respectively, are attached at two opposite edges.

4. The lightweight construction fastener according to claim 3, wherein the substantially angular basic shape is rectangular or square.

5. The lightweight construction fastener according to claim 1, wherein the flat base plate has a substantially round basic shape, and the protrusions or lugs, respectively, are attached at opposite locations of the base plate.

6. The lightweight construction fastener according to claim 5, wherein the substantially round basic shape is oval.

7. The lightweight construction fastener according to claim 1, wherein the outer side of the second leg does not have any side walls, ribs or similar reinforcements, which are arranged parallel to the longitudinal axis LA in the longitudinal direction, in an accommodating area of the base plate.

8. A lightweight construction fastener or clip nut, respectively, comprising:
a clip body, comprising
a first leg and a second leg, which are arranged located opposite one another and which are connected to one another by a web on one end;
a direction of extension of the legs away from the web defines a longitudinal axis LA, which is in a substantially vertical position on the web; and sides of the legs, which face one another, define inner sides and sides of the legs facing away from one another define outer sides, fastening element comprising a flat base plate comprising two protrusions or lugs, respectively, and a holding part, which is connected to the base plate, comprising a central opening, which extends through the base plate, two frames located on the outer side of the second leg, the two frames comprising apertures, which accommodate the protrusions of the fastening element and which are spaced apart from one another such that the fastening element is held in the clip body with play in a captive manner;

the frames are substantially arranged at right angles to the longitudinal axis LA and a connecting line thus runs through the two apertures parallel to the longitudinal axis LA;

the flat base plate has a substantially round basic shape, and the protrusions or lugs, respectively, are attached at opposite locations of the base plate; and the flat base plate has two further protrusions or lugs, respectively, which are arranged rotated by 90° with respect to the protrusions or lugs.

9. The lightweight construction fastener according to claim 8, wherein the further protrusions or lugs are embodied identical in shape to the protrusions or lugs.

10. A lightweight construction fastener or clip nut, respectively, comprising;
a clip body, comprising
a first leg and a second leg, which are arranged located opposite one another and which are connected to one another by a web on one end;
a direction of extension of the legs away from the web defines a longitudinal axis LA, which is in a substantially vertical position on the web; and sides of the legs, which face one another, define inner sides and sides of the legs facing away from one another define outer sides, fastening element comprising a flat base plate comprising two protrusions or lugs, respectively, and a holding part, which is connected to the base plate, comprising a central opening, which extends through the base plate, two frames located on the outer side of the second leg, the two frames comprising apertures, which accommodate the protrusions of the fastening element and which are spaced apart from one another such that the fastening element is held in the clip body with play in a captive manner;

the frames are substantially arranged at right angles to the longitudinal axis LA and a connecting line thus runs through the two apertures parallel to the longitudinal axis LA; and at least one of the protrusions or lugs, respectively, or the further protrusions or lugs, respectively, are embodied as projecting wire loops, which are integrally formed on the wire nut from the wire of the wire nut without interruptions.

* * * * *